J. E. NEWTON.
NUT LOCK.
APPLICATION FILED JUNE 6, 1916.
1,254,929. Patented Jan. 29, 1918.
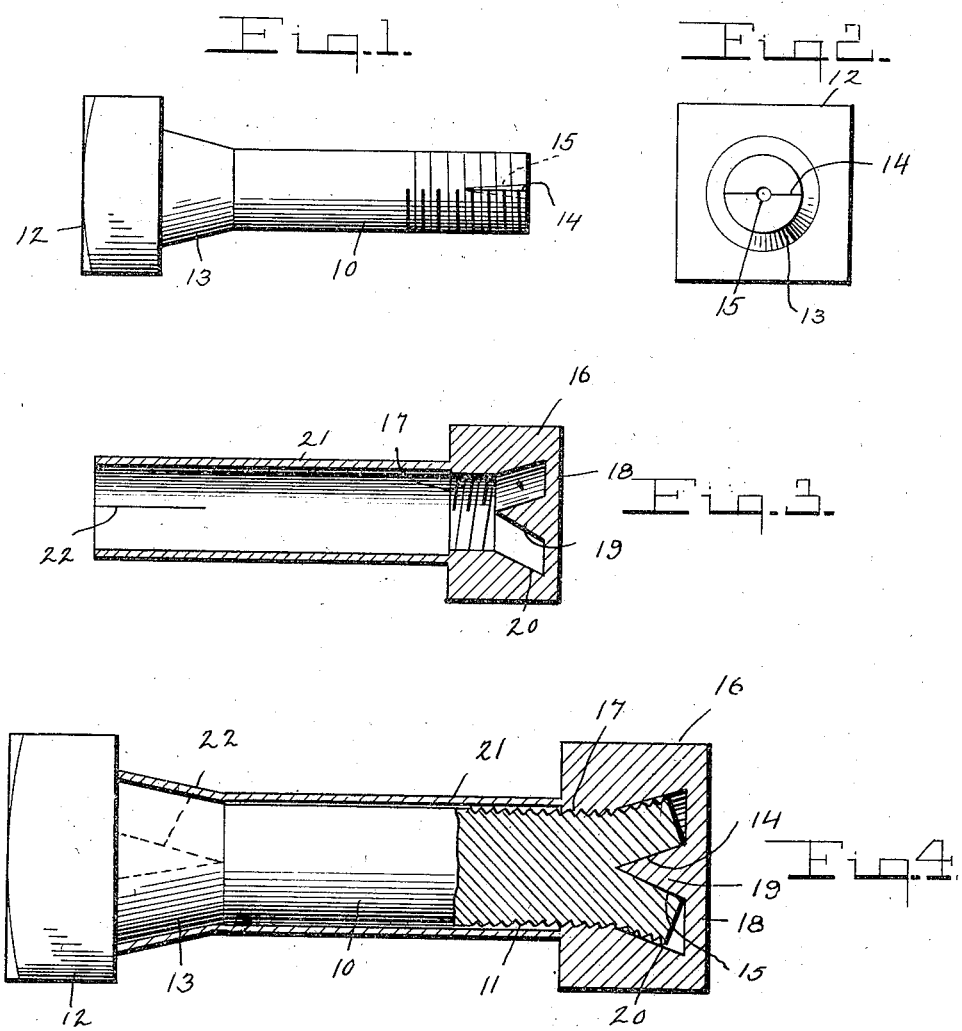
Inventor
J. E. Newton

UNITED STATES PATENT OFFICE.

JOHN E. NEWTON, OF GRAND MARAIS, MINNESOTA, ASSIGNOR OF ONE-HALF TO JAMES PINKERTON, OF GRAND MARAIS, MINNESOTA.

NUT-LOCK.

1,254,929.  Specification of Letters Patent.  Patented Jan. 29, 1918.

Application filed June 6, 1916. Serial No. 101,933.

*To all whom it may concern:*

Be it known that I, JOHN E. NEWTON, a citizen of the United States, residing at Grand Marais, in the county of Cook and State of Minnesota, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks and has for its object to provide a novel type of nut lock in which the nut is provided with means for spreading or expanding the end of the bolt to prevent the removal of the nut therefrom.

With this and other objects in view, the invention consists in the novel construction, combination and arrangement of parts as will be hereinafter specifically described, claimed, and illustrated in the accompanying drawing, in which:

Figure 1 represents a side elevation of the improved bolt.

Fig. 2 represents an end elevation thereof.

Fig. 3 represents a longitudinal sectional view through the nut.

Fig. 4 represents a sectional view, partly broken away, through the nut applied to the bolt.

Referring to the drawing in detail wherein similar reference numerals designate corresponding parts throughout the several views, the numeral 10 indicates the shank of a bolt having external screw threads 11 depending inwardly from one end and a head 12 at the opposite end, the portions of the shank adjacent the head 12 being gradually increased in diameter to provide an inclined shoulder 13. The end of the bolt shank 10 is formed with a diametrical slit 14 which intersects an inwardly tapering recess 15 formed axially in the ends thereof.

A nut 16 is fitted upon the threaded terminal of the bolt 10 and the outer portion 17 of the bore thereof is formed with internal screw threads fitting the external screw threads of the bolt 10, and the end of the bore opposite the screw threads 7 is closed by an end wall 18, having a tapered lug 19, which is disposed in line with the longitudinal axis of the bore of the nut and is adapted to engage in the recess 15 in the bolt to spread the slit end thereof. The pointed bore adjacent the end wall 18 is flared or gradually increased in diameter, as indicated at 20, to accommodate the spread or expanded end of the bolt, as clearly shown in Fig. 4.

An elongated flange or tubular extension 21 is formed integral with the nut 16 in concentric relation to the bore thereof and is provided at its outer terminal with diametrical slits 22 adapted, when the tubular extension is advanced upon the inclined shoulder 13 of the bolt shank, to be spread apart.

In use, the nut 16 is applied to the bolt 10 in the usual manner and as it is advanced by the screw threads the tapered lug 19 enters the recess 15 in the bolt shank, thereby spreading or expanding the slit ends of the bolt and spreading them into the enlarged portion 20 of the nut bore, thereby firmly locking the nut against removal. Simultaneously with the expansion of the slit or bifurcated end of the bolt, the slit outer terminal of the tubular extension 21 moves over the inclined shoulder 13 and is spread so as to be wedged against an object clamped between the nut and the head of the bolt thus preventing the nut from working loose or off the end of the bolt as a double locking action set up, as clearly shown in Fig. 4.

It is further understood that various changes in the form, proportion and minor details of construction may be resorted to without departing from the spirit or sacrificing any of the advantages of the construction.

What I claim is:

A nut lock comprising a bolt having a diametrical slit at one end thereof, an inclined shoulder adjacent the opposite end, a nut fitted upon said bolt having one end of the bore enlarged, an end wall closing the enlarged end of said bore, a tapered lug carried by said end wall and adapted to engage and spread or expand the slitted end of said bolt, and a tubular extension carried by said nut and being of a length approximately the length of the bolt to receive said bolt and having its free end slitted to be expanded by the inclined shoulder of the bolt after the same has passed through an object, as and for the purpose specified.

In testimony whereof I affix my signature in presence of two witnesses.

JOHN E. NEWTON.

Witnesses:
JAMES H. PINKERTON,
CARL G. STUTSTAD.